United States Patent
Andre et al.

(10) Patent No.: US 11,519,302 B2
(45) Date of Patent: Dec. 6, 2022

(54) INTERNAL STRUCTURE OF A PRIMARY EXHAUST DUCT HAVING A SEPARATOR OF WHICH THE GEOMETRY VARIES DEPENDING ON THE TEMPERATURE

(71) Applicant: Airbus Operations SAS, Toulouse (FR)

(72) Inventors: Sandrine Andre, Toulouse (FR);
Vincent Trocellier, Toulouse (FR);
Julien Ferreira, Toulouse (FR);
Michael Kilkenny, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 17/181,566

(22) Filed: Feb. 22, 2021

(65) Prior Publication Data
US 2021/0262364 A1 Aug. 26, 2021

(30) Foreign Application Priority Data
Feb. 24, 2020 (FR) ..................................... 2001801

(51) Int. Cl.
*F01D 25/30* (2006.01)
*F02K 1/04* (2006.01)
(Continued)

(52) U.S. Cl.
CPC ............... *F01D 25/30* (2013.01); *F02K 1/04* (2013.01); *F02K 1/085* (2013.01); *B64D 33/06* (2013.01);
(Continued)

(58) Field of Classification Search
CPC ........ F02K 1/08–085; F02K 1/10; F02K 1/18; F02K 1/42; F05D 2300/502–50212;
(Continued)

(56) References Cited

U.S. PATENT DOCUMENTS 6,718,752 B2 * 4/2004 Nesbitt ..................... F02K 1/48
60/264
7,716,932 B2 * 5/2010 Core ..................... F02K 1/1207
239/265.33

(Continued)

OTHER PUBLICATIONS

French Search Report; priority document.

*Primary Examiner* — Stephanie Sebasco Cheng
(74) *Attorney, Agent, or Firm* — Greer, Burns & Crain, Ltd.

(57) ABSTRACT

An internal structure of a primary exhaust duct of a turbomachine, which has a primary wall allowing air to pass through orifices and forming an internal surface of the primary exhaust duct, an interior skin arranged inside the primary wall, and at least one separator of which a first edge region is attached to the interior skin and which has two geometries. A change from the first geometry to the second takes place when the temperature of the separator exceeds a first temperature, and the change from the second to the first takes place when the temperature of the separator drops below a second temperature. The coefficient of expansion of the separator is greater than that of the interior skin. The variation in the geometry of the separators depending on the temperature of the engine eases assembly at ambient temperature due to the compression of the separators.

6 Claims, 3 Drawing Sheets

(51) Int. Cl.
  *F02K 1/08* (2006.01)
  *F02K 1/34* (2006.01)
(52) U.S. Cl.
  CPC .... *F05D 2220/323* (2013.01); *F05D 2250/90* (2013.01); *F05D 2260/31* (2013.01); *F05D 2260/963* (2013.01)
(58) Field of Classification Search
  CPC ........... F05D 2300/505; F05D 2240/14; F05D 2260/941; F05D 2230/642; F01D 25/14–145; F01D 25/24–265; F01D 25/30; F01D 11/005; F01D 11/18; F01D 11/24; F01D 9/023; F23R 2900/00017–00019; F02C 7/18–185
  See application file for complete search history.

(56) References Cited

U.S. PATENT DOCUMENTS

| | | | |
|---|---|---|---|
| 7,870,740 B2* | 1/2011 | Bunel | F01D 25/14 60/766 |
| 8,210,799 B1* | 7/2012 | Rawlings | F01D 11/005 415/173.1 |
| 8,789,833 B2* | 7/2014 | Zheng | F16J 15/022 415/174.2 |
| 9,605,550 B2* | 3/2017 | Graves | F02M 31/07 |
| 2007/0256889 A1 | 11/2007 | Yu et al. | |
| 2013/0017065 A1* | 1/2013 | Webster | F02K 1/1207 415/148 |
| 2015/0034412 A1 | 2/2015 | Mecuson et al. | |
| 2018/0274389 A1 | 9/2018 | Miller | |

* cited by examiner

FIG. 1
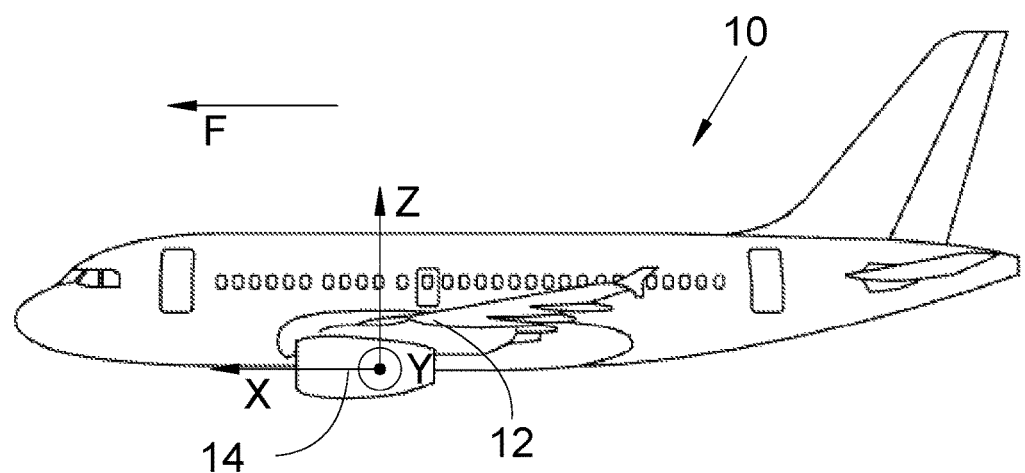
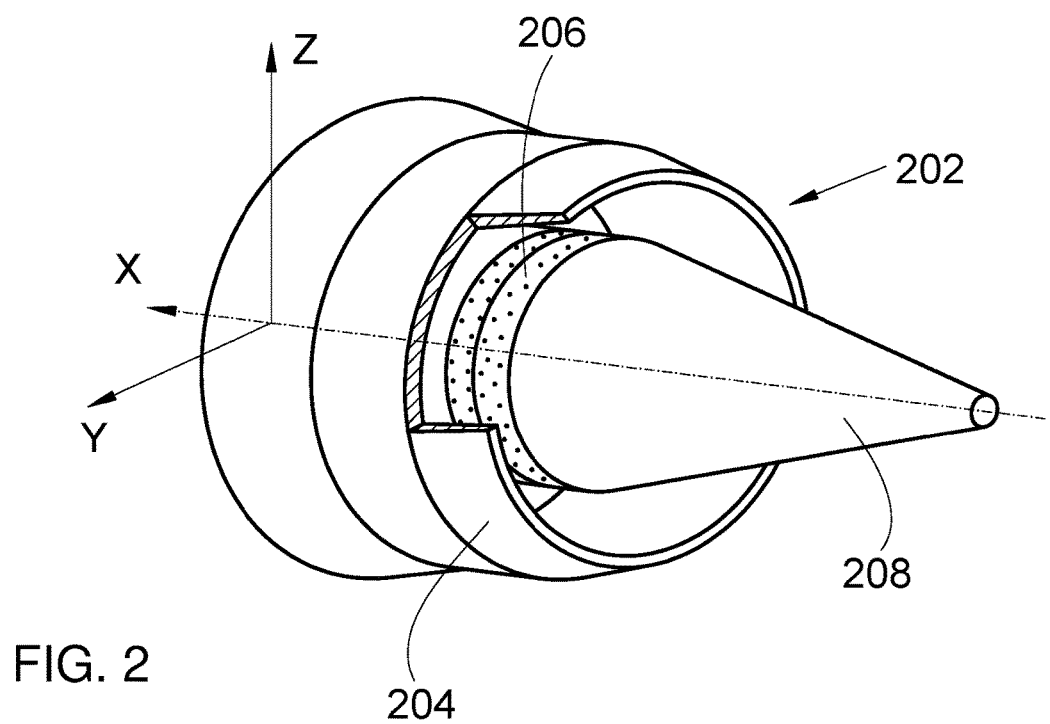
FIG. 2

INTERNAL STRUCTURE OF A PRIMARY EXHAUST DUCT HAVING A SEPARATOR OF WHICH THE GEOMETRY VARIES DEPENDING ON THE TEMPERATURE

CROSS-REFERENCES TO RELATED APPLICATIONS

This application claims the benefit of the French patent application No. 2001801 filed on Feb. 24, 2020, the entire disclosures of which are incorporated herein by way of reference.

FIELD OF THE INVENTION

The present invention relates to an internal structure of a primary exhaust duct of a turbomachine which has at least one separator of which the geometry varies depending on the temperature, to a turbomachine having such an internal structure, and to an aircraft having at least one such turbomachine.

BACKGROUND OF THE INVENTION

A turbomachine conventionally has, from upstream to downstream, an air inlet through which the air enters the turbomachine, an engine which combusts the air and fuel, and an exhaust duct through which the burnt gases are evacuated.

A turbomachine of this kind generates noise during operation.

In order to attenuate some of this noise, the turbomachine is surrounded with a nacelle having noise attenuating means such as honeycomb structures.

Low-frequency sounds (between 300 Hz and 1000 Hz), in particular those linked to combustion and emitted by the turbomachine during takeoff or landing, represent a significant source of noise for the environment and, in order to attenuate this noise, it is known to arrange devices for attenuating low-frequency sounds in the structure of the primary exhaust duct (also called "plug").

The primary exhaust duct is located in the extension of the engine and in front of the nozzle cone, and its exterior primary wall is in contact with the flow of burnt gas coming from the engine.

A device of this kind is effective, but it is necessary to find new embodiments.

The document US-A-2007/256889 discloses an internal structure of a primary exhaust duct of a turbomachine which has separators, but each of these separators is attached by at least three of its edges to a rigid structure, and a change in geometry of these separators under the effect of a variation in temperature is therefore entirely ruled out so as not to deform the internal structure.

The document US-A-2018-274389 discloses a method for assembly by deformation under the effect of a variation in temperature.

SUMMARY OF THE INVENTION

The present invention has an object of proposing an internal structure of a primary exhaust duct of a turbomachine which comprises devices for attenuating low-frequency noise, which is simple and easy to implement and which uses at least one separator of which the geometry varies depending on the temperature.

To that end, the invention proposes an internal structure of a primary exhaust duct of a turbomachine, the internal structure having:
a primary wall comprising a surface of revolution about a longitudinal axis X, allowing the air to pass through orifices and forming an internal surface of the primary exhaust duct,
an interior skin comprising a surface of revolution about the longitudinal axis X, arranged inside the primary wall, and
at least one separator which is attached only to the interior skin by a region along a first edge by at least two attachments and which has a first geometry and a second geometry, wherein the change from the first geometry to the second geometry takes place when the temperature of the separator exceeds a first temperature, and the change from the second geometry to the first geometry takes place when the temperature of the separator drops below a second temperature less than or equal to the first temperature, and wherein the coefficient of expansion of the separator is greater than that of the interior skin, wherein, in the first geometry, the separator is wound on itself, and, in the second geometry, the separator is opened out and extends so as to bring the second edge as close as possible to the primary wall.

The variation in the geometry of the separators depending on the temperature of the engine makes assembly at ambient temperature easier on account of the compression of the separators.

Advantageously, each attachment allows rotation of the separator about an axis perpendicular to the interior skin.

Advantageously, the internal structure has two attachments and, between the two attachments, at least one means for guiding the separator with respect to the interior skin, which allows the movement of the first edge over the interior skin.

Advantageously, each guide means is in the form of a bolt that sandwiches the separator and the interior skin through orifices provided for this purpose, and one of the orifice passing through the separator or the orifice passing through the interior skin has an oblong shape allowing the movement of the threaded shank of the bolt.

The invention also proposes a turbomachine having a primary exhaust duct bounded outwardly by a primary nozzle and inwardly by an internal structure according to one of the preceding variants.

The invention also proposes an aircraft having at least one turbomachine according to the preceding variant.

BRIEF DESCRIPTION OF THE DRAWINGS

The abovementioned features of the invention, along with others, will become more clearly apparent upon reading the following description of an exemplary embodiment, the description being given with reference to the appended drawings, in which:

FIG. 1 is a side view of an aircraft according to the invention,

FIG. 2 is a perspective view of a primary exhaust duct,

DETAILED DESCRIPTION OF THE PREFERRED EMBODIMENTS

Figure 3:
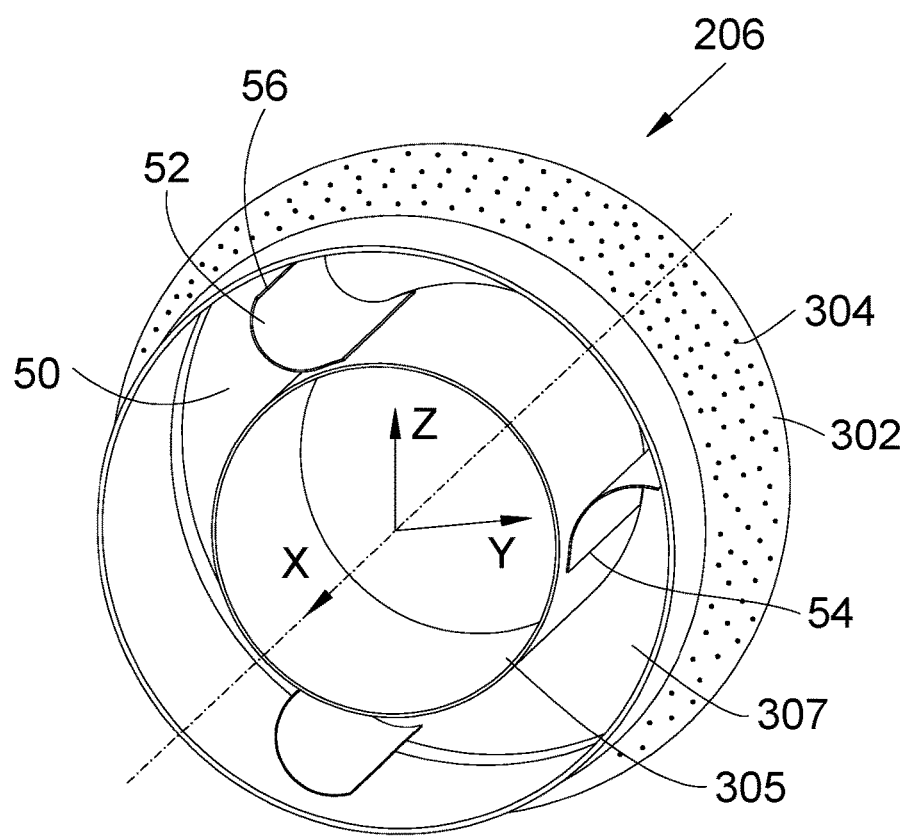
FIG. 3 is a perspective view of an internal structure of a primary exhaust duct according to the invention.

FIG. 1 shows an aircraft 10 which has a wing 12, beneath which there is attached a nacelle 14 which houses a turbomachine.

In the following description, and as is conventional, the X axis is the longitudinal axis of the turbomachine, with positive orientation in the direction of forward movement of the aircraft 10, this also being the longitudinal axis of the nacelle 14; the Y axis is the transverse axis which is horizontal when the aircraft 10 is on the ground; the Z axis is the vertical axis or vertical height when the aircraft 10 is on the ground; these three directions X, Y and Z are mutually orthogonal.

In the following description, terms relating to a position are considered with reference to the direction of movement of the aircraft 10 when the turbomachine is in operation, and indicated by the arrow F.

FIG. 2 shows the rear part of the turbomachine which forms a primary exhaust duct 202 via which the gases burnt by the turbomachine escape and which is delimited outwardly by a primary nozzle 204 and inwardly by an internal structure 206 of the primary exhaust duct 202.

The primary exhaust duct 202, and its internal structure 206, have an overall shape that comprises surfaces of revolution about the longitudinal axis X of the turbomachine.

A nozzle cone 208 is attached to the rear of the internal structure 206.

Figure 4:
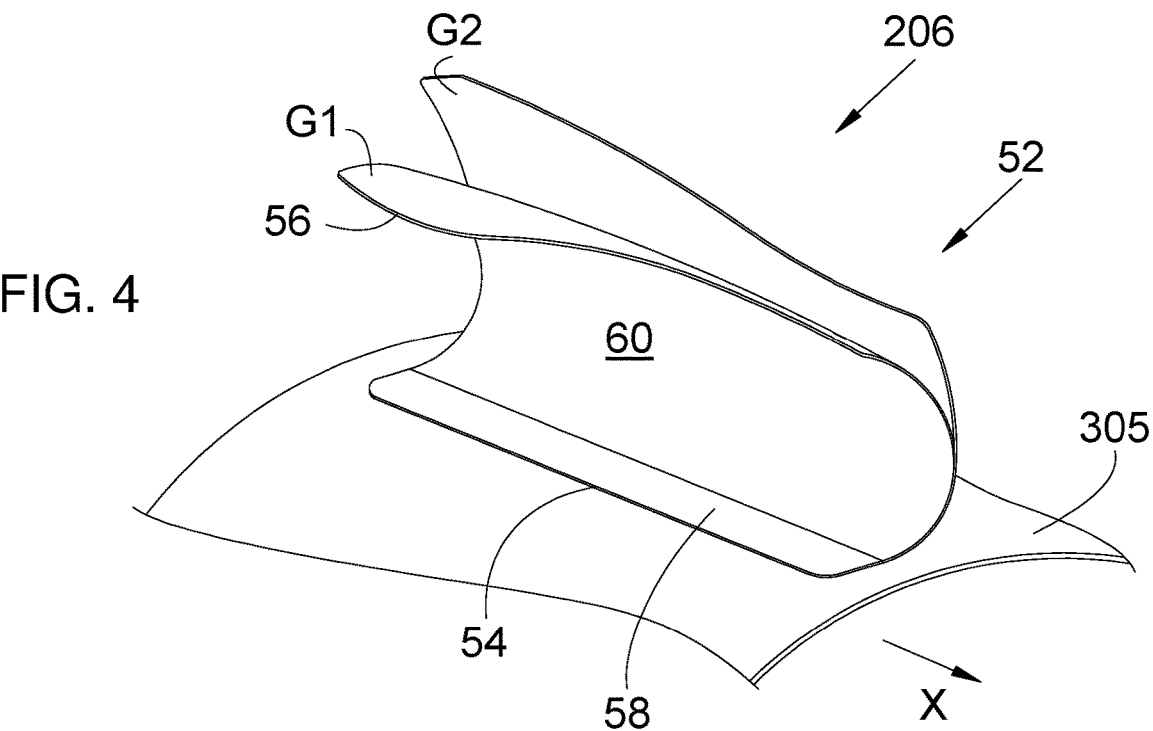
FIG. 4 is a perspective view of a separator in two use positions.

FIG. 3 shows a front perspective view of the internal structure 206, and FIG. 4 is a view of a part of the internal structure 206.

The internal structure 206 has a primary wall 302 in which are created holes 304 distributed over the surface of the primary wall 302. The primary wall 302 forms the exterior surface of the internal structure 206, meaning that it forms the internal surface of the primary exhaust duct 202.

The internal structure 206 has an interior skin 305. The primary wall 302 and the interior skin 305 each comprise a surface of revolution about the longitudinal axis X which, in this example, is cylindrical overall, and the interior skin 305 is arranged inside the primary wall 302 so as to constitute an assembly of two coaxial surfaces.

The interior skin 305 is attached to the primary wall 302 by any appropriate means that are known to a person skilled in the art, for example an upstream flange (not shown) and a downstream flange 307 attached between the primary wall 302 and the interior skin 305. Each flange 307 is attached using any appropriate means such as screws, welding, etc.

The volume 50 between the interior skin 305 and the primary wall 302 forms a box which constitutes a Helmholtz resonator.

In order to divide the volume 50 into a plurality of sub-volumes, the internal structure 206 has at least one separator 52 which takes the form of a strip of which a region along a first edge 54 is attached to the interior skin 305. The separator 52 is not attached to the primary wall 302 so as to not stress the assembly in the event of deformation of the internal structure 206 and to leave the other edges of the separator 52 free. The first edge 54 is generally parallel to the longitudinal axis X. Moreover, as is clearly shown in FIG. 4, the separator 52 is attached only to the interior skin 305 at its first edge 54, and the second edge 56 opposite to the first edge 54 is not attached to the primary wall 302, and neither the front edge nor the rear edge, which connect the first edge 54 and the second edge 56, are attached to a structure of the internal structure 206.

The region of each separator 52 is attached to the interior skin 305 by any appropriate means such as bolts.

The separator 52 is made from a material which allows the geometry of the separator 52 to change depending on the temperature of the separator 52.

The separator 52 has a first geometry G1 and a second geometry G2. The change from the first geometry G1 to the second geometry G2 takes place when the temperature of the separator 52 exceeds a first temperature greater than ambient temperature and preferably around 300° C., and, conversely, the change from the second geometry G2 to the first geometry G1 takes place when the temperature of the separator 52 drops below a second temperature lower than or equal to the first temperature.

In the first geometry G1, the geometry is referred to as retracted, and the separator 52 is gathered in on itself and in this case is more specifically wound on itself. Thus, the second edge 56 opposite to the first edge 54 is close to the first edge 54 so as to reduce the size of the separator 52 radially with respect to the longitudinal axis X.

In the second geometry G2, the geometry is referred to as opened out, and the separator 52 is opened out and extends so as to bring the second edge 56 as close as possible to the primary wall 302. Thus, the second edge 56 is separated from the first edge 54 so as to increase the size of the separator 52 radially with respect to the longitudinal axis X in order to divide the volume 50.

As is explained below, such an architecture makes it possible to assemble the internal structure 206 at ambient temperature with the separators 52 in the retracted position, making it easier to install them.

According to one particular embodiment, in order to avoid contact between the separator 52 and the primary wall 302, the length of the separator 52 is smaller than the distance between the primary wall 302 and the interior skin 305. The gap between the second edge 56 and the primary wall 302 is, for example, around 2 mm.

As shown in FIG. 4, the separator 52 is attached to the interior skin 305 by a base 58 which extends along the first edge 54 and constitutes the region attached to the interior skin 305, and the separator 52 extends beyond the base 58 by way of a strip 60. The strip 60 extends between the base 58 and the second edge 56.

In the embodiment of the invention presented here, and in a radial plane, the strip 60 has a parallelepipedal overall shape when it is spread out.

The characteristics of the separator 52, for example the materials, the dimensions of the strip 60 and of the base 58 (thickness, width, length), are chosen such that the separator 52 changes shape depending on the temperature, as described above.

The separator 52 is made from a material with a coefficient of expansion greater than that of the interior skin 305.

Thus, in the first position, at ambient temperature, the base 58 is slightly curved so as to follow the interior skin 305.

When the temperature increases, the interior skin 305 expands axially and, since the base 58 expands more, its curvature will increase so as to follow the expansion of the interior skin 305 and, with the curvature increasing, the strip 60 will naturally open out.

Figure 5:
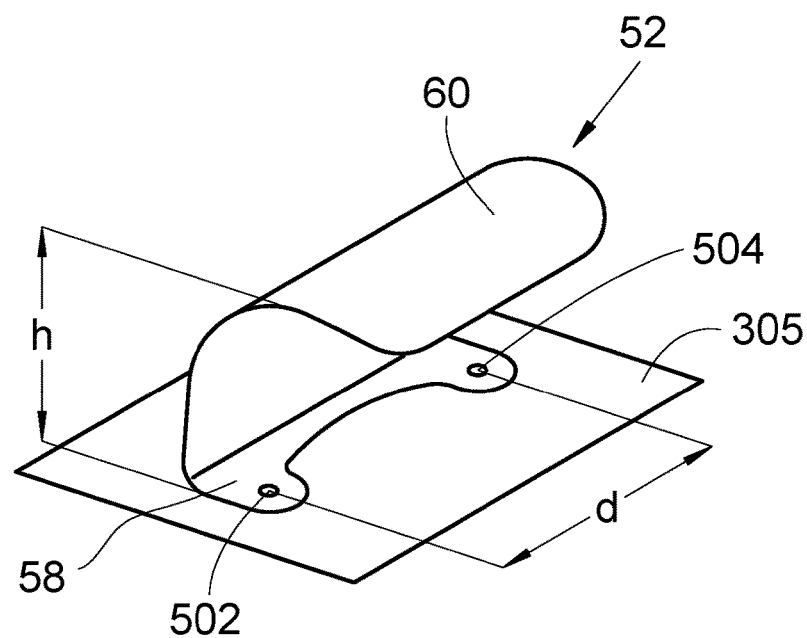
FIG. 5 shows a perspective view of the separator in a first geometry.

FIG. 5 shows the separator 52 in the first geometry and attached to the interior skin 305, that is to say, under ambient temperature conditions. The separator 52 is attached to the interior skin 305 by two attachments 502 and 504, allowing a rotation of the separator 52, in this case of the base 58, about an axis perpendicular to the interior skin 305, for example two bolts with a clearance and/or washers. The distance between the two attachments 502 and 504 under ambient temperature conditions is "d".

As explained above, in the first geometry, the separator 52 has a curved shape in its upper part, that is to say, the strip 60 which is the part that is not attached to the interior skin 305, and this shape makes it possible to reduce its size "h" perpendicularly to the interior skin 305, in order to make it easier to install for an application on an internal structure 206 of a primary exhaust duct 202.

As already specified above, the coefficient of thermal expansion of the separator 52 is greater than the coefficient of thermal expansion of the interior skin 305, and the interior skin 305 is, for example, more rigid than the separator 52, for example, on account of having a greater thickness.

Figure 6:
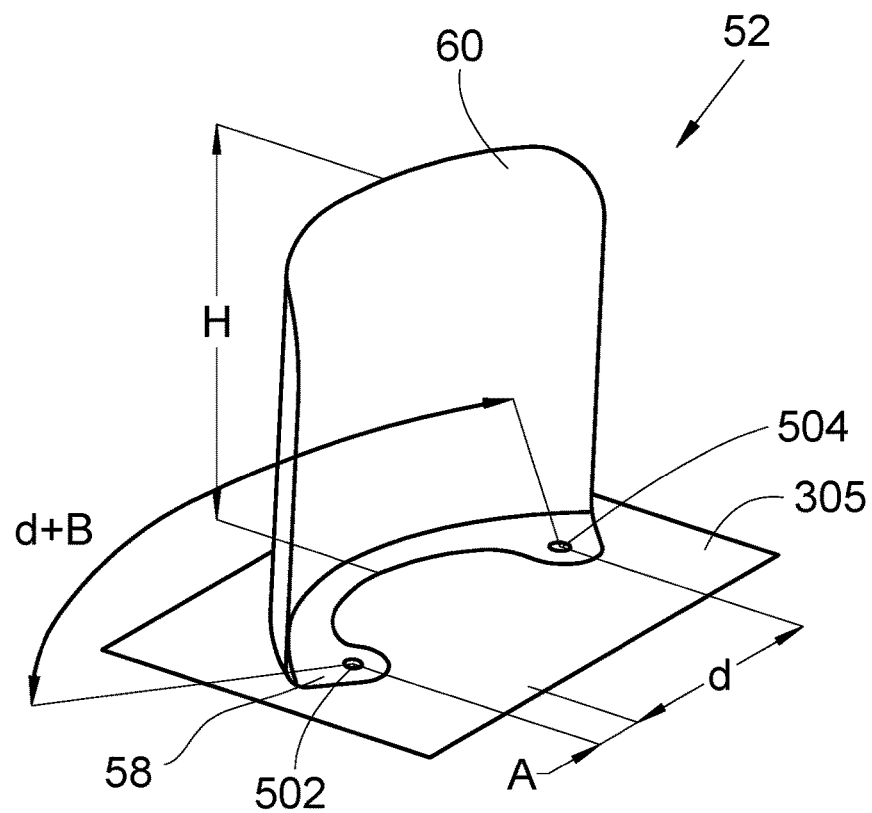
FIG. 6 shows a perspective view of the separator in a second geometry.

FIG. 6 shows the separator 52 in the second geometry, that is to say, under high-temperature engine output temperature conditions.

On account of the increase in temperature, the interior skin 305 has expanded by a distance A, in particular parallel to the line passing through the two attachments 502 and 504, and the two attachments 502 and 504 are now spaced apart by a distance greater than the distance d.

On account of the differences between the coefficients of thermal expansion, the separator 52 has expanded by a distance B which is greater than the distance A.

Since it is constrained by the two attachments 502 and 504, the separator 52 curves about an axis normal to the interior skin 305 in order to effect its thermal expansion. The first edge 54 thus moves over the interior skin 305 in order to curve.

This curvature normal to the interior skin 305 has the effect of reducing, or even eliminating, the initial curvature of the upper part at ambient temperature, making it possible for the separator to open out over its entire height "H" and thus fully carry out its function.

A drop in temperature makes it possible to return to the initial position in FIG. 5.

Thus, as already explained above, the difference in expansion between the separator 52 and the interior skin 305 triggers the change in shape of the separator 52 depending on the temperature and makes it easier to mount.

The strip 60 curves continuously in a direction which brings it closer to the interior skin 305 when its temperature decreases and it straightens continuously in an opposite direction when its temperature increases.

Preferably, the separator 52 has characteristics that are chosen such that it starts to open out linearly at a temperature value (first temperature) of around 300° C. and is completely opened out at a temperature greater than 400° C.

The separator 52 comprises, for example, sheets made from shape memory materials chosen from one of the following combinations: Titanium and Cr—Ni—Fe (chromium-nickel-iron) alloy, or nickel and iron, or copper and aluminum alloy or copper and zinc.

An example of a method for assembling the internal structure 206 comprises:
  a first provision step during which the primary wall 302 is provided,
  a second provision step during which the interior skin 305 is provided,
  a third provision step during which at least one separator 52 is provided,
  for each separator 52, a first attachment step during which each separator 52 is attached to the interior skin 305,
  an introduction step during which the interior skin 305 and the separators 52 are introduced into the primary wall 302, and
  a second attachment step during which the interior skin 305 is attached to the primary wall 302.

Given that the introduction step is carried out at ambient temperature lower than the first temperature, the separators 52 are gathered in on themselves and can thus easily pass to the inside of the primary wall 302.

In order to best guide the separator 52 when it curves about the axis normal to the interior skin 305 during its thermal expansion, the internal structure 206 has at least one means for guiding the separator 52 with respect to the interior skin 305 which allows the movement of the first edge 54 over the interior skin 305.

According to one particular embodiment, the two attachments 502 and 504 are arranged at the two ends of the first edge 54, that is to say, in this case of the base 58, and the guide means is/are distributed between the two attachments 502 and 504.

Each guide means is in the form, for example, of a bolt that sandwiches the separator 52, in this case the first edge 54 and more specifically the base 58, and the interior skin 305 through orifices provided for this purpose, and one of the orifice passing through the separator 52 or the orifice passing through the interior skin 305 has an oblong shape allowing the movement of the threaded shank of the bolt during the movement of the first edge 54. The orientation of the oblong orifice is generally radial with respect to the normal axis about which the separator 52 curves.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An internal structure of a primary exhaust duct of a turbomachine, said internal structure comprising:
  a primary wall comprising a plurality of holes and a surface of revolution about a longitudinal axis, allowing air to pass through the plurality of holes and forming an internal surface of the primary exhaust duct,
  an interior skin comprising a surface of revolution about the longitudinal axis, arranged inside the primary wall, and
  a separator having a first edge, the separator attached only to the interior skin and only by a region along the first edge, the separator capable of changing from a first geometry to a second geometry,
  wherein a change from the first geometry to the second geometry takes place when a temperature of the separator exceeds a first temperature, and a change from the second geometry to the first geometry takes place when the temperature of the separator drops below a second temperature less than or equal to the first temperature, wherein a coefficient of expansion of the separator is greater than that of the interior skin, wherein, in the first geometry, the separator is wound on itself, wherein, in the second geometry, the separator is unwound and fully extends so as to bring a second edge of the separator adjacent to the primary wall, and wherein a gap is maintained between the separator and the primary wall at all times.

2. The internal structure according to claim 1, further comprising two attachments attaching the region along the first edge of the separator to the interior skin, wherein each of the two attachments allows rotation of the separator about an axis perpendicular to the interior skin.

3. The internal structure according to claim 2, wherein at least one of the two attachments forms a respective guide, wherein each guide, guides the separator with respect to the interior skin, which allows a movement of the first edge over the interior skin.

4. The internal structure according to claim 3, wherein each guide is formed as a bolt that sandwiches the separator and the interior skin through a first orifice passing through the separator and a second orifice passing though the interior skin, and wherein one of the orifice passing through the separator or the orifice passing through the interior skin has a shape allowing a movement of the bolt.

5. A turbomachine having a primary exhaust duct bounded outwardly by a primary nozzle and inwardly by an internal structure of the primary exhaust duct of the turbomachine, said internal structure comprising:

a primary wall comprising a plurality of holes and a surface of revolution about a longitudinal axis, allowing air to pass through the plurality of holes and forming an internal surface of the primary exhaust duct, an interior skin comprising a surface of revolution about the longitudinal axis, arranged inside the primary wall, and a separator having a first edge, the separator attached only to the interior skin and only by a region along the first edge, the separator capable of changing from a first geometry to a second geometry, wherein a change from the first geometry to the second geometry takes place when a temperature of the separator exceeds a first temperature, and a change from the second geometry to the first geometry takes place when the temperature of the separator drops below a second temperature less than or equal to the first temperature, wherein a coefficient of expansion of the separator is greater than that of the interior skin, wherein, in the first geometry, the separator is wound on itself, wherein, in the second geometry, the separator is unwound and fully extends so as to bring a second edge of the separator adjacent to the primary wall, and wherein a gap is maintained between the separator and the primary wall at all times.

6. An aircraft having a turbomachine having a primary exhaust duct bounded outwardly by a primary nozzle and inwardly by an internal structure of the primary exhaust duct of the turbomachine, said internal structure comprising:

a primary wall comprising a plurality of holes and a surface of revolution about a longitudinal axis, allowing air to pass through the plurality of holes and forming an internal surface of the primary exhaust duct, an interior skin comprising a surface of revolution about the longitudinal axis, arranged inside the primary wall, and a separator having a first edge, the separator attached only to the interior skin and only by a region along the first edge, the separator capable of changing from a first geometry to a second geometry, wherein a change from the first geometry to the second geometry takes place when a temperature of the separator exceeds a first temperature, and a change from the second geometry to the first geometry takes place when the temperature of the separator drops below a second temperature less than or equal to the first temperature, wherein a coefficient of expansion of the separator is greater than that of the interior skin, wherein, in the first geometry, the separator is wound on itself, wherein, in the second geometry, the separator is unwound and fully extends so as to bring a second edge of the separator adjacent to the primary wall, and wherein a gap is maintained between the separator and the primary wall at all times.

* * * * *